United States Patent

Iwasaki

[11] Patent Number: 5,604,584
[45] Date of Patent: Feb. 18, 1997

[54] PHOTOMETRY DEVICE WITH CORRECTION FOR TEMPERATURE CHANGE

[75] Inventor: Hiroyuki Iwasaki, Kanagawa-ken, Japan

[73] Assignee: Nikon Corporation, Tokyo, Japan

[21] Appl. No.: 439,370

[22] Filed: May 11, 1995

[30] Foreign Application Priority Data

Jun. 23, 1994 [JP] Japan .................................. 6-141846

[51] Int. Cl.$^6$ .................................................. G01J 1/42
[52] U.S. Cl. .................................................. 356/218
[58] Field of Search .............................. 356/213, 215,
356/218, 221, 223, 226, 227, 229, 230,
243, 43, 44; 355/33, 30; 250/205, 238,
214 R, 214 C; 354/428, 464

[56] References Cited

U.S. PATENT DOCUMENTS 4,038,555  7/1977  Freeman .................................. 250/573
4,790,669 12/1988  Christensen ............................... 356/44
5,105,093  4/1992  Niwa ........................................ 250/574
5,327,210  7/1994  Okui et al. ............................... 356/218

FOREIGN PATENT DOCUMENTS 3-235586  10/1991  Japan .

Primary Examiner—Hoa Q. Pham
Attorney, Agent, or Firm—Oliff & Berridge

[57] ABSTRACT

A photometry device provides accurate photometry outputs over temperature by correcting light sensitivity variations of a light receiving element due to temperature variations. The photometry device includes the light receiving element, a light sensitivity detection device and a light sensitivity correction device. A correction formula is determined from the outputs of the light sensitivity corrections device generated at a standard condition and a condition other than the standard condition. The light sensitivity correction device corrects the outputs of the light receiving elements based on the correction formula.

16 Claims, 9 Drawing Sheets

PHOTOMETRY DEVICE WITH CORRECTION FOR TEMPERATURE CHANGE

BACKGROUND OF THE INVENTION

1. Field of the Invention

The invention relates to a photometry device that corrects light receiving element outputs for temperature variations.

2. Description of Related Art

A conventional photometry device includes a light receiving element having light shielding pixels and light receiving pixels. The light shielding pixels generate dark current outputs because the light shielding pixels are shielded from light. FIG. 11 shows the relationship between an output from a light shielding pixel and temperature for a conventional photometry device as described in Japanese Patent Application No. 3-235586. The photometry device corrects the output from the light receiving pixels for temperature variations. The correction is performed by subtracting a value corresponding to an output of the light shielding pixels from the output of the light receiving pixels.

The outputs from the light shielding pixels are divided into four temperature groups A, B, C, and D corresponding to four temperature zones. The outputs of the light receiving pixels are corrected for temperature variations by first identifying which one of the temperature groups A, B, C or D has a temperature that most closely matches the temperature of the light receiving pixels. Based on the identified temperature group A, B, C or D, a correction coefficient corresponding to the identified temperature group is read from a memory. Then, a temperature correction value is generated by multiplying a dark correction value corresponding to the outputs of the light shielding pixels of the identified temperature group by the correction coefficient. Finally, the output from the photometry device is corrected for temperature variations by subtracting the temperature correction value from the output of each light receiving pixel of the light receiving element.

The conventional photometry device described above only corrects a dark current temperature variations of the light receiving elements. However, light sensitivity changes of the light receiving elements due to temperature variations are not corrected. Thus, the photometry device continues to generate different outputs for objects with the same brightness due to temperature variations.

SUMMARY OF THE INVENTION

An object of the embodiments of the invention is to provide a photometry device that obtains accurate photometry outputs by correcting light sensitivity changes in the light receiving element due to temperatures thus generating consistent outputs for objects with the same brightness independent of temperature variations.

In order to achieve the above and other objects, the photometry device includes a light receiving element generating an output signal from light incident on a subject field. The amplitude of the light receiving element output signal corresponds to an intensity of light from the subject field. A light sensitivity detection device generates light sensitivity output data. A light sensitivity correction device corrects the amplitude of the output signal of the light receiving element for changes due to temperature variations of the light receiving element based on at least the light sensitivity output data generated by the light sensitivity detection device.

The photometry device also includes a temperature detection device that generates a temperature value corresponding to the temperature of the light receiving element. The temperature detection device is one of a thermistor circuit and an optically shielded pixel element that generates an output value which is related to the temperature of the light receiving element.

This invention also provides a method for correcting the amplitude of the light receiving element output signal for changes to temperature. The method includes determining correction formulas for the light receiving element output signal amplitude changes due to temperature based on at least the outputs of the light sensitivity detection device, determining a current temperature and correcting the amplitude of the light receiving element output signal at the current temperature based on at least the outputs of the light sensitivity detection device.

BRIEF DESCRIPTION OF THE DRAWINGS

The invention will be described in detail with reference to the following drawings, wherein.

DETAILED DESCRIPTION OF PREFERRED EMBODIMENTS

Figure 1:
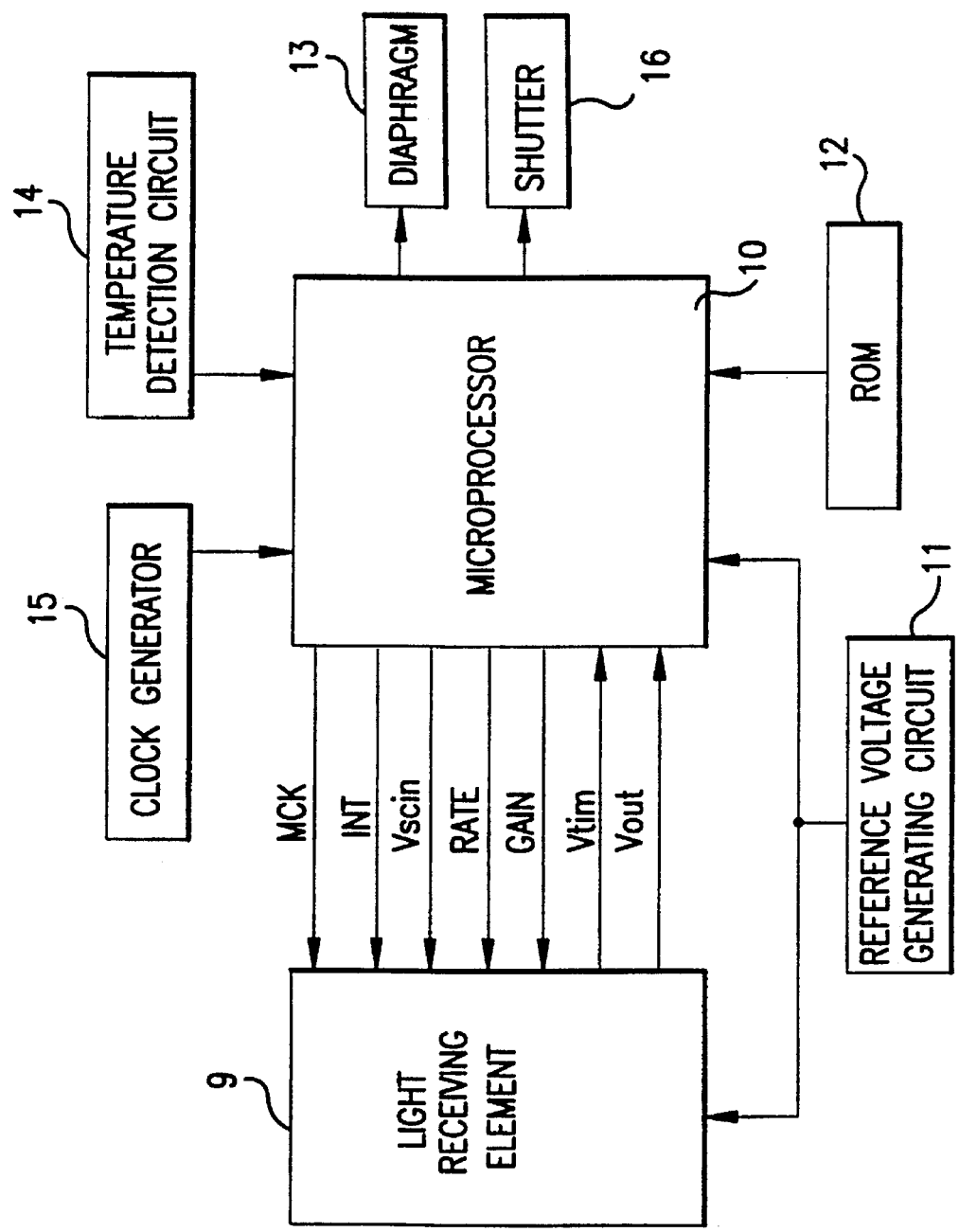
FIG. 1 is a block diagram of a preferred embodiment of a photometry device.

FIG. 1 is a block diagram of a preferred embodiment showing the basic structure of a photometry device. The microprocessor 10 is a controller for the photometry device. The microprocessor 10 includes various timers, A/D converters, serial communication interfaces, and a RAM. A clock generator 15 outputs a 20 MHz clock signal. The microprocessor 10 and a light receiving element 9 input the 20 MHz clock signal as a system clock. The microprocessor 10 controls all the components included with the microprocessor 10 based on a 10 MHz clock signal derived from the 20 MHz clock signal. The microprocessor 10 controls the light receiving element 9, the light exposure of the photometric device as well as other input and output operations connected with the photometry device.

Figure 2A:
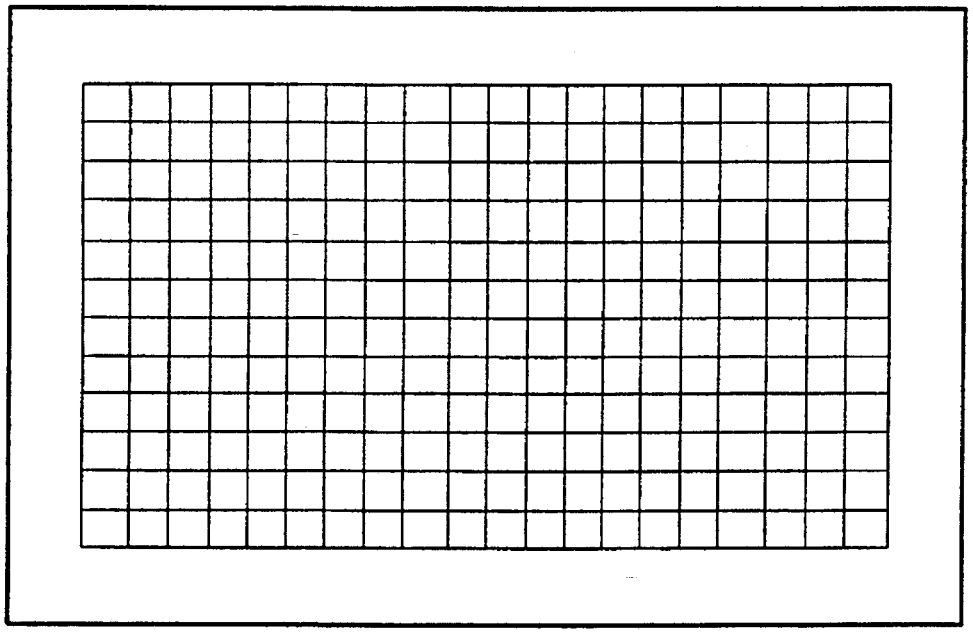
FIG. 2A is a diagram of 240 regions of a subject field of a light receiving element shown in FIG. 1.

The light receiving element 9 is an accumulation-type element such as a CCD sensor. FIG. 2A shows a photometric division state of the light receiving element 9 composed on the subject field. Photometry is conducted by dividing the entire subject field into 240 regions in a grid having 20 horizontal units i and 12 vertical units j.

Figure 2B:
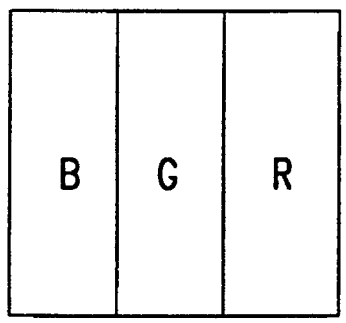
FIG. 2B is a diagram of three spectral regions for each of the 240 regions of the subject field shown in FIG. 2A.
Figure 3:
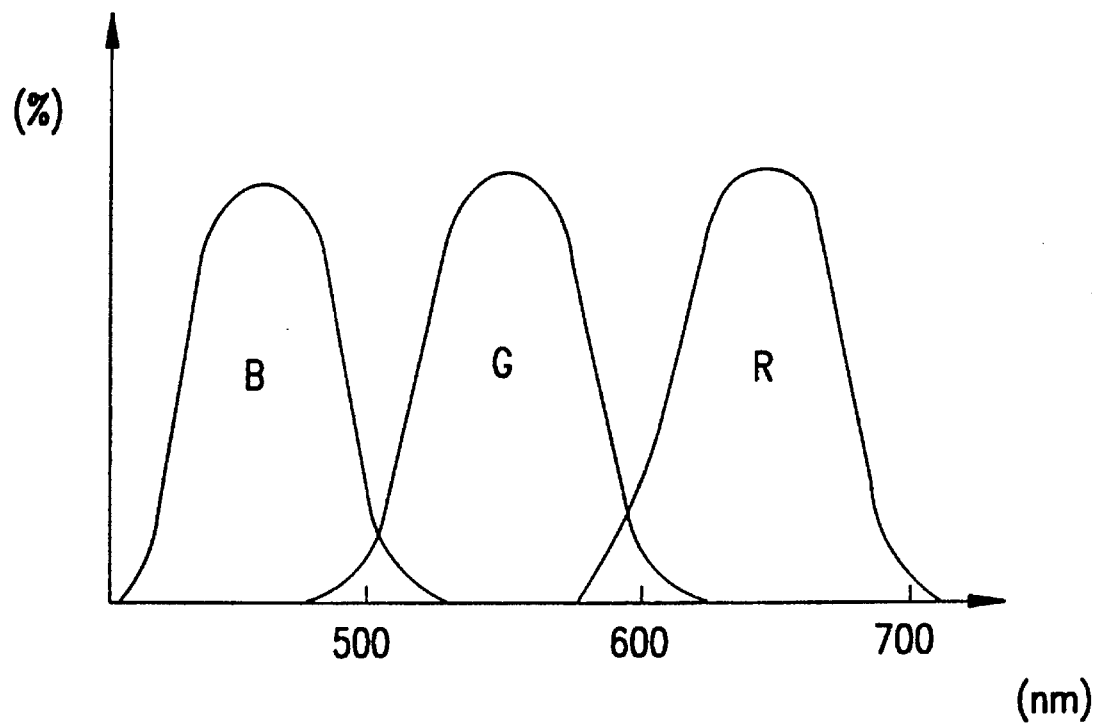
FIG. 3 is a wave form of the spectral sensitivity distributions of the three spectral regions shown in FIG. 2B.

FIG. 2B shows that each unit is further divided into three sensitivity regions B, G, and R. Each sensitivity region has a different spectral sensitivity distribution than the other two sensitivity regions. Photometry is executed for each sensitivity region independent of the other sensitivity regions. The sensitivity regions B, G, and R correspond to blue, green and red spectral regions, respectively, having the characteristics shown in FIG. 3.

A reference voltage Vref is input into the microprocessor 10 and the light receiving element 9 from a reference voltage generating circuit 11. The light receiving element 9 transmits an output signal Vout which is a voltage relative to the reference voltage Vref. The microprocessor 10 converts the output signal Vout from the light receiving element 9 into a digital signal using the A/D converter. The A/D converter uses the reference voltage Vref as a standard.

The microprocessor 10 outputs five signals to the light receiving element 9 and receives two signals from the light receiving element 9. The microprocessor 10 outputs a master clock signal MCK. The master clock signal MCK is a basic clock signal for the light receiving element 9. The microprocessor 10 generates an accumulation indicator signal INT to control the commencement and termination of accumulation in the light receiving element 9. The microprocessor 10 sets initial parameters in the light receiving element 9 through an initial signal Vscin. The microprocessor 10 controls the frequency division ratios of the master clock MCK in the light receiving element 9 through the RATE signal. Finally the microprocessor 10 controls the gain of the light receiving element output circuit by a GAIN signal.

The signals output from the light receiving element 9 to the microprocessor 10 include an output timing signal Vtim and the output signal Vout. The microprocessor 10 performs A/D conversion on the light receiving element 9 output signal Vout synchronized with the falling edge of the timing signal Vtim. The digital output of the A/D converter is first corrected for power source voltage variations, temperature dependent variations, and sensitivity variations before being stored in the RAM for each photometry accumulation period t.

The microprocessor 10 computes a correction value t0 based on photometry data which includes an exit pupil distance P0, a focal length f, and an aperture stop value F0 of a shooting lens. The photometry data is read from a lens ROM 12 through a regular serial communication interface. The microprocessor 10 also computes a brightness value for each of the 240 regions within the subject field based on the correction value t0 and the photometry accumulation period t.

The microprocessor 10 computes the appropriate exposure value using well-known methods based on a determined brightness value. When a release button is depressed, the microprocessor 10 controls the diaphragm 13 and the shutter 16 to expose the film according to an appropriate exposure value.

Figure 4:
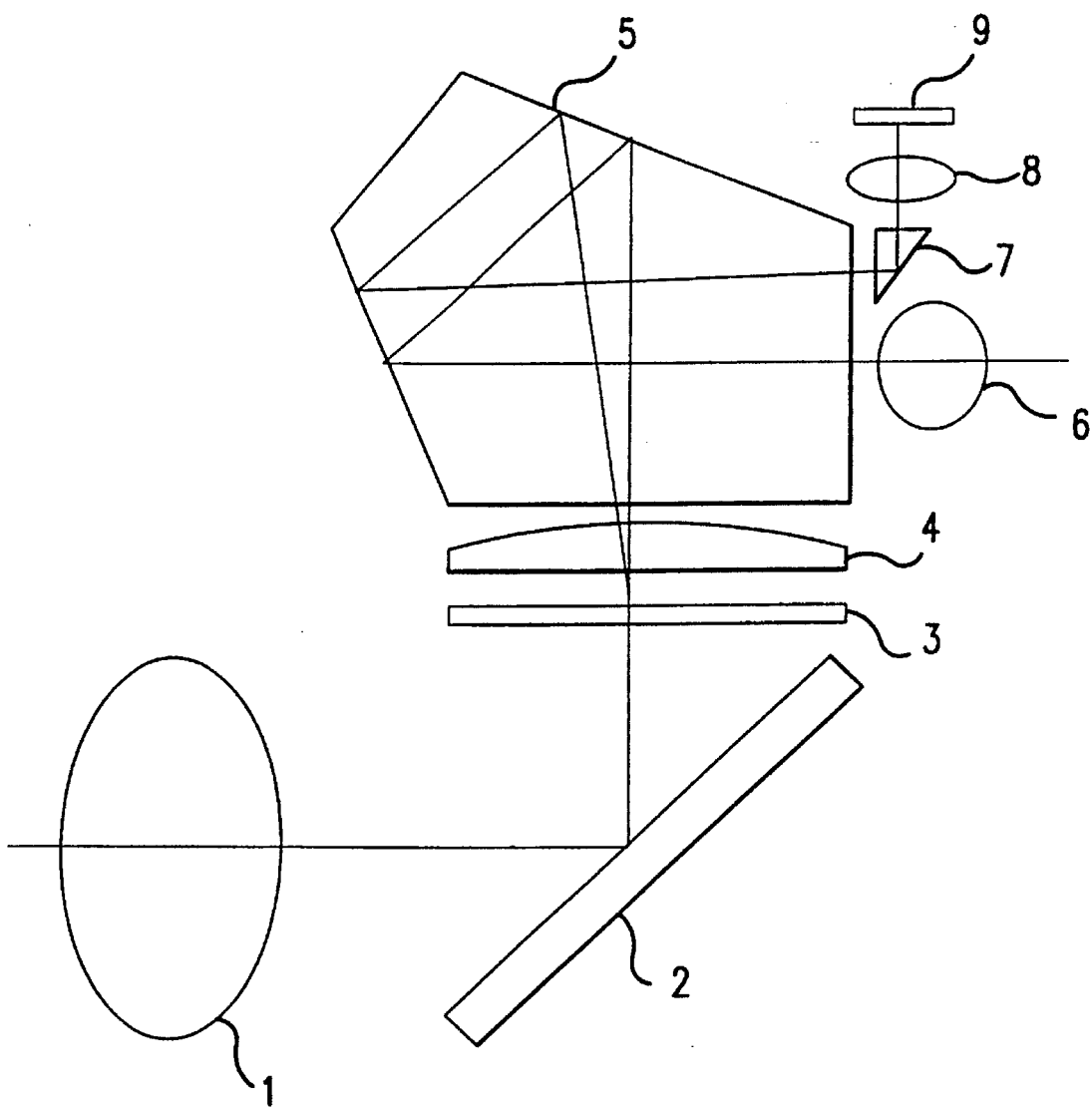
FIG. 4 is a block diagram of the optical system of the photometry device.

FIG. 4 is a block diagram showing an optical system of a camera equipped with the photometry device of the invention. Light rays which pass through the shooting lens 1 pass through the quick return mirror 2, a diffusion screen 3, a condenser lens 4, a pentagonal prism 5, and an eyepiece lens 6 to reach the eye of a photographer. A portion of the light that is diffused by the diffusion screen 3 reaches the light receiving element 9 after passing through the condenser lens 4, the pentagonal prism 5, the photometry prism 7, and the photometry lens 8.

Figure 5:
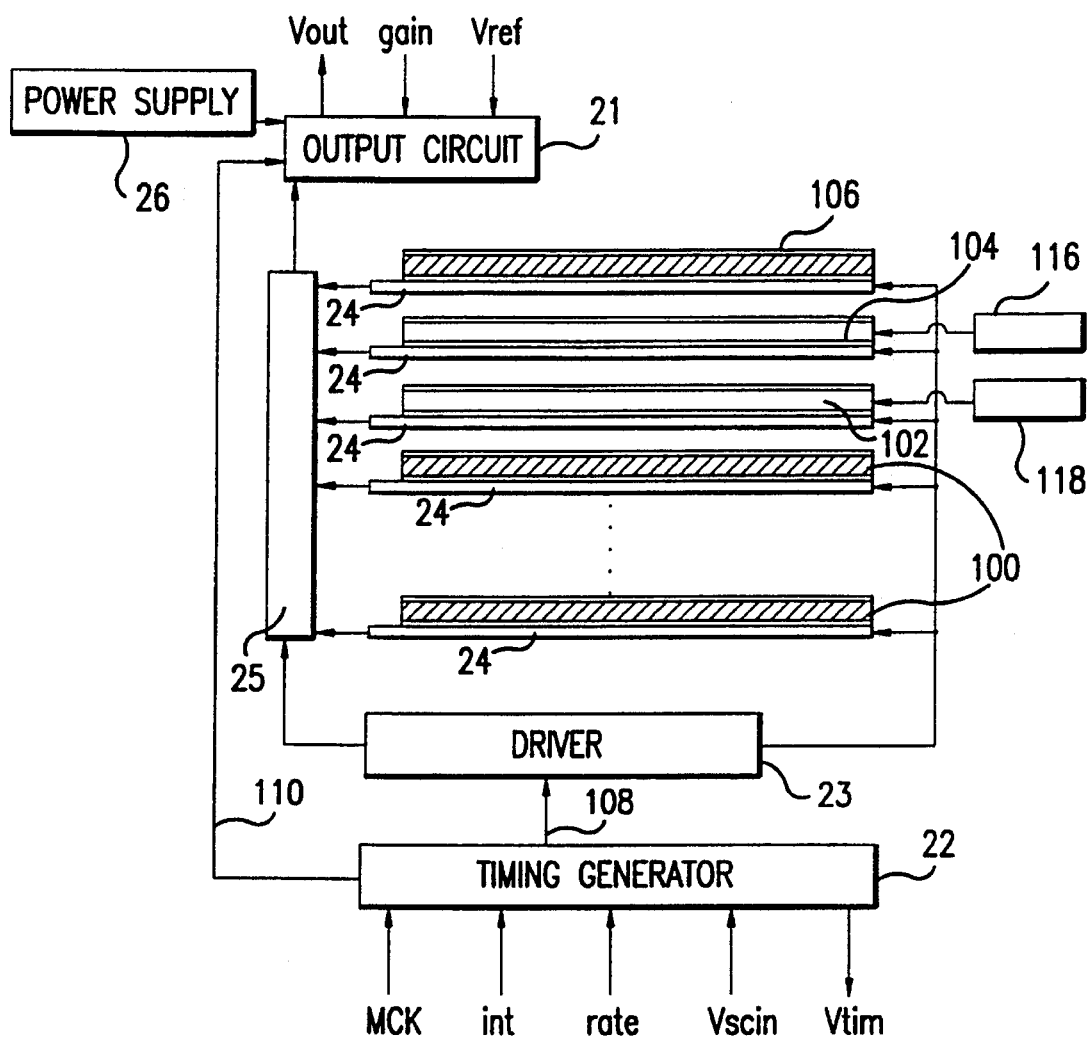
FIG. 5 is a block diagram of the light correction receiving element.

FIG. 5 shows the internal structure of the light receiving element 9. Sensor units 100 are the shaded regions. Light rays incident on these sensor units 100 are photoelectrically converted generating an electric charge. The electric charge is conveyed to the output circuit 21 via the H registers 24 and the V register 25. The difference in electrical potential relative to the reference voltage Vref is output from the output circuit 21 as the output signal Vout.

The sensor units 100 include pixels corresponding to sensitivity regions B, G, and R. The sensitivity regions B, G and R are positioned periodically along the H registers 24. Photoelectric converting efficiency of the sensor units 100 is variable due to temperature deviation. An optically shielded pixel 106 (OPB pixel) provides a dark current signal.

Monitor pixels 104 and 102 are provided. The monitor pixel 104 is located next to the OPB pixel 16 and the monitor pixel 102 is located next to the monitor pixel 104. The monitor pixels 104 and 102 do not perform photoelectric conversions. Predetermined amounts of electric charge are injected into these pixels through charge injectors 116 and 118 independent of the accumulation time t. The monitor pixels 104 and 102 are injected with different predetermined amounts of electric charge. Based on the outputs of the monitor pixels 104 and 102, the changes in the output circuit 21, such as gain for example, and changes in the output signal Vout caused by changes in power source voltage generated by a power source 26 and temperature are corrected.

The GAIN signal from the microprocessor 10 is input into the output circuit 21. When the GAIN signal is HIGH, the amplification of the output circuit 21 is set to 1. When the GAIN signal is LOW, the amplification is set to 4. The master clock MCK, the accumulation indicator signal INT, the RATE signal, and the initialization signal Vscin are input into the timing generator 22. The amplification of the output circuit 21 is variable due to changes in the power source voltage and the temperature.

The timing generator 22 generates a driving signal 108 which drives a driver 23 and the V register 25. The driver 23 drives each of the H and V registers 24 and 25. The timing generator 22 also generates a base clock signal by dividing the frequency of the master clock signal MCK by 32 when the RATE signal is HIGH and dividing the frequency of the master clock signal MCK by 16 when the RATE signal is LOW.

The initialization signal Vscin is normally HIGH. When the light receiving element 9 is powered ON, the initialization signal Vscin is set to LOW. When the initialization signal Vscin becomes LOW, the timing generator 22 generates the driving signal 108 at a frequency of eight times that of the base clock. At this frequency, the driving signal 108 causes the residual electric charge in each of the H and V registers 24 and 25 to be rapidly expelled, thus initializing the H and V registers 24 and 25. The initialization signal Vscin is set to LOW for the amount of time needed to initialize all of the components of the light receiving element 9. When the initialization signal Vscin is LOW, the output signal Vout generated by the output circuit 21 is equal to the reference voltage Vref.

The accumulation phase of the light receiving element 9 occurs when the accumulation indicator signal int is LOW. Normally the accumulation indicator signal int is HIGH. When the accumulator indicator signal int is set to LOW, the accumulation phase starts. The accumulation phase terminates when the accumulation indicator signal INT returns to HIGH. When the accumulation indicator signal transitions from LOW to HIGH, the electric charge in each of the H registers 24 is transmitted to the V register 25.

Figure 6:
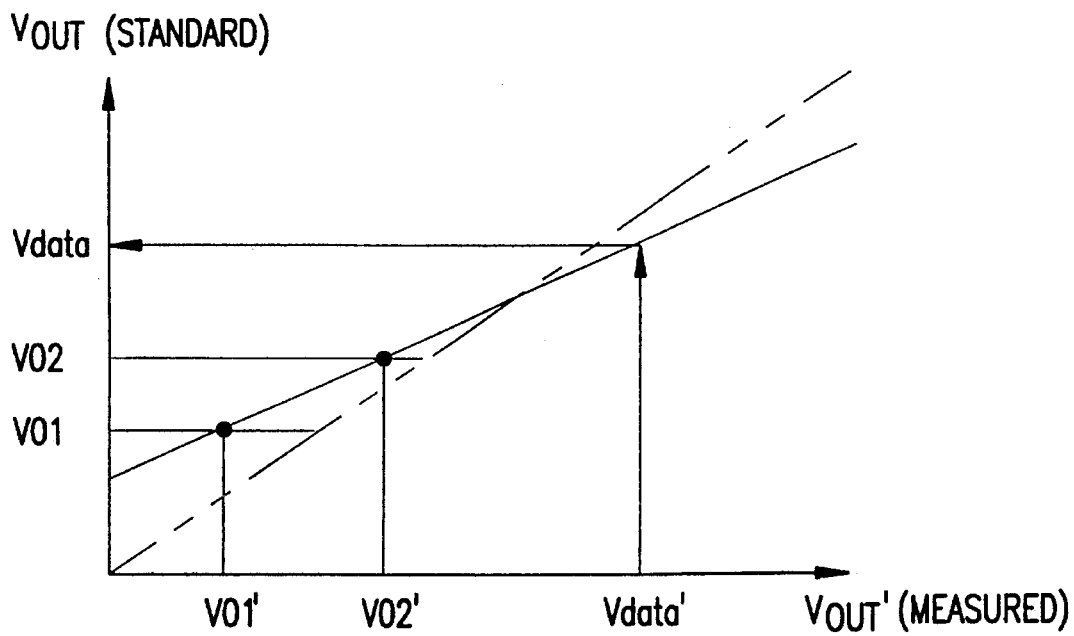
FIG. 6 is a graph of a correction line.

FIG. 6 is a graph showing the relationship between the output signal Vout' and the output signal Vout when the power supply and the temperature are set to specified standard values. Outputs of the monitor pixels 104 and 102 are used to correct changes in the output signal Vout' of the output circuit 21 caused by changes in the power source voltage supplied to the light receiving element 9 and changes in the temperature.

The horizontal axis represents the output signal Vout' of the light receiving element 9, while the vertical axis represents the output signal Vout of the light receiving element 9 when the power source voltage and the temperature are set to the specified standard values. When the power supply voltage and the temperature is at the specified standard value, the light receiving element 9 is in a standard condition. The microprocessor 10 executes a program to obtain an accurate brightness value when the light receiving element 9 is in the standard condition. Thus, the output values generated by this program must be corrected when the light receiving element 9 is not in the standard condition.

The relationship between Vout (standard), when the light receiving element 9 is in the standard condition and Vout (measured), when the light receiving element 9 is in a current condition which may be different then the standard condition, is shown by a dotted line in FIG. 6. The monitor pixels 104 and 102 are independent of the accumulation time during the standard condition and the output values of the monitor pixels 104 and 102 are VO1 and VO2, respectively. Thus, VO1 and VO2 are standard condition output values of the monitor pixels 104 and 102. If the power supply voltage and the temperature change during measurement, the output values of the monitor pixels change from the standard condition output values VO1 and VO2 to VO1' and VO2', respectively, as shown in FIG. 6. The output values of the monitor pixels change because the amplification of the output circuit 21 changes when the power source voltage and the temperature change. The monitor pixel output values VO1 and VO2 and actual output values VO1' and VO2', determine a correction line having two points at coordinates (VO1', VO1) and (VO2', VO2). This correction line is shown as the solid line in FIG. 6. The equation of the correction line is:

$$Vdata=(VO2-VO1)/(VO2'-VO1')*Vdata+(VO1*VO2'-VO1'*VO2)/(VO2'-VO1'). \quad (1)$$

Based on the correction line equation (1), the corrected light receiving element output value is Vdata for an actual light receiving element output value Vdata'. Although the correction is made by a straight line correction method using the outputs of the two monitor pixels 104 and 102, the correction can be made with the outputs of any number of monitor pixels. If one monitor pixel is used, the light receiving elements 9 can only be corrected by an offset value rather than linear correction by a straight line. Correction by an offset value is less effective than correction by a straight line. However, correction by an offset value requires only one monitor pixel which reduces the cost of an additional monitor pixel.

Figure 7:
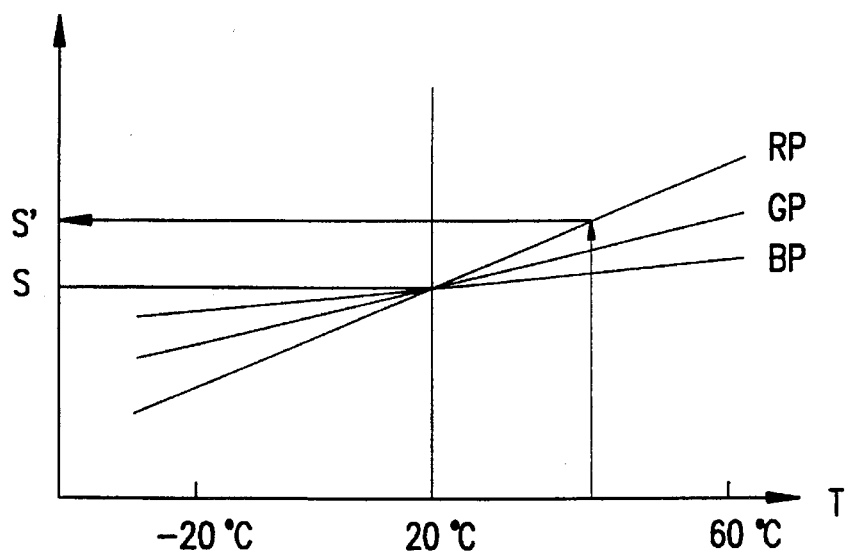
FIG. 7 is a graph of a light sensitivity of each spectral region with respect to temperature.

FIG. 7 shows a graphical representative of the relationship between temperature and sensitivity of light receiving pixel regions BP, GP, and RP. BP, GP and RP correspond to the blue, green and red spectral regions.

The graphs in FIG. 7 are normalized by setting a sensitivity at the standard condition to be S. The temperature at the standard condition is set to 20° C for this embodiment. The light receiving element 9 includes photoelectric conversion units made of silicon photo diodes (SPD). The sensitivity of the SPD is affected by the absorption coefficient $\alpha$ of silicon. The absorption coefficient $\alpha$ varies with temperature such that the sensitivity of each light receiving pixel region BP, GP and RP increases as temperature rises.

The value of the absorption coefficient $\alpha$ depends on the wavelength of light incident on the SPD. The absorption coefficient $\alpha$ is smaller for longer wavelengths of light. Therefore, for the BP light receiving pixel region corresponding to the blue spectral region, which has a short wavelength, the light absorption is high. Most of the blue light is absorbed at the surface of the SPD. When the absorption coefficient $\alpha$ decreases and the amount of blue light absorbed decreases, the light not absorbed by the surface of the SPD is absorbed by the silicon deeper in the SPD body. Thus, because the absorption coefficient $\alpha$ for blue light is high, a change in the absorption coefficient a does not affect the total absorption as much compared to longer wavelength light where the absorption coefficient $\alpha$ is lower.

The RP light receiving pixel region corresponding to the red spectral region has a low light absorption because red light has a longer wavelength than the wavelength of blue light. The red light penetrates deeper into the SPD because less red light is absorbed at the surface of the SPD. Some red light penetrates through the SPD body completely without being absorbed at all. As the absorption coefficient $\alpha$ increases and the amount of red light absorbed increases, the red light that previously penetrated the SPD body without being absorbed, is absorbed. Thus, more red light contributes to the output of the light receiving pixel region RP. The absorption of additional light causes the sensitivity of the RP light receiving pixel region to have greater changes with changes in the absorption coefficient $\alpha$.

As explained above, the microprocessor 10 executes a program to obtain an accurate brightness value under the standard condition. Therefore, the output values of the program must be corrected for the power source voltage and temperature deviations from the standard condition.

Based on the graphs in FIG. 7, the corrected output signal Vout is the actual output signal Vout' multiplied by the ratio of the sensitivity value S at standard condition and the actual value sensitivity S'. Thus, it is possible to correct a change of the photoelectric converting efficiency in the sensor units 100. The relationship between the output signal Vout, the actual output signal Vout' and the sensitivity value S is:

$$Vout=(S/S')*Vout'. \quad (2)$$

Figure 8A:
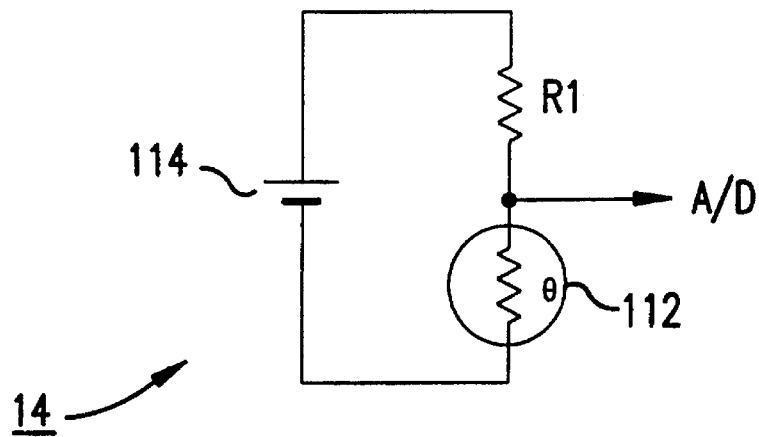
FIG. 8A is a circuit diagram of a temperature detection circuit.
Figure 8B:
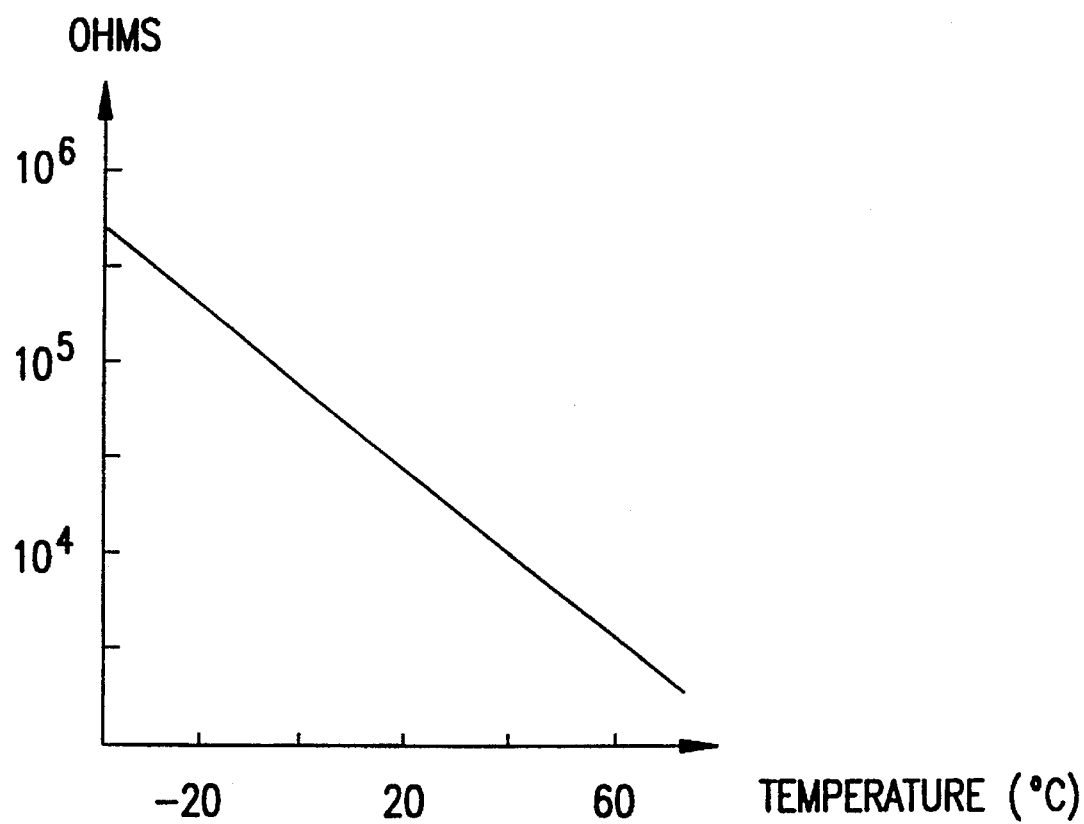
FIG. 8B is a graph of a temperature characteristic of the temperature detection circuit of FIG. 8A.

FIG. 8A shows an example of a temperature detection circuit 14. A thermistor 112 changes its resistance in OHMs with temperature as shown in FIG. 8B. The temperature is determined by dividing a preset voltage from the voltage source 114 using a resistor R1 and monitoring the voltage between the resistor R1 and the thermistor 112 using the A/D converter in the microprocessor 10. A temperature-voltage characteristic curve is stored in the microprocessor 10 in order to accurately determine the temperature. The temperature-voltage characteristic curve also accounts for the temperature characteristics of the resistor R1.

Figure 9:
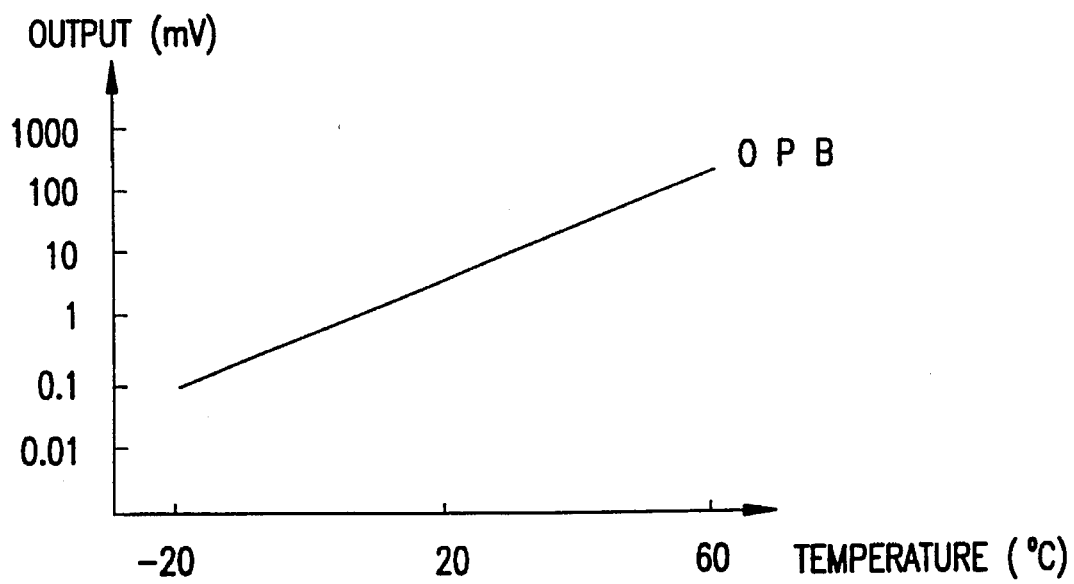
FIG. 9 is a graph of an output value of a light shielding pixel with respect to temperature.
Figure 11:
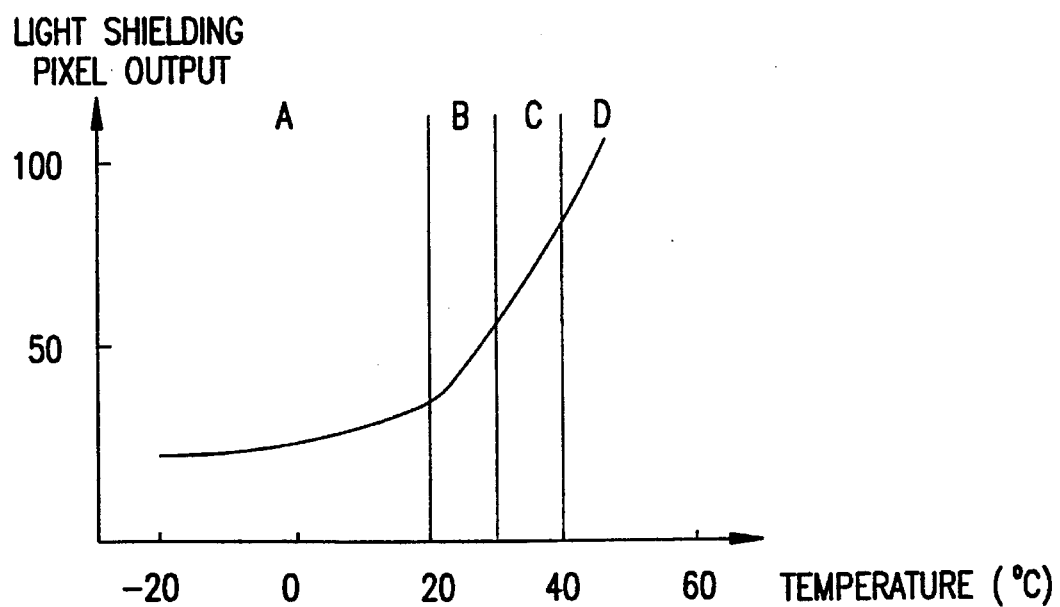
FIG. 11 is a graph of the output of light shielded pixels with respect to temperature of a conventional photometry device.

A second embodiment of the temperature detection circuit 14 detects the temperature without a special temperature detection circuit. FIG. 9 shows a relationship between temperature and the output of the OPB pixel 106 during a certain accumulation time t. The OPB pixel output value Vopb is proportional to the accumulation time t and exponentially related to the temperature T:

$$Vopb = A*t*2^{(T/8)} \qquad (3)$$

A is a constant, t is the accumulation time and T is the temperature. Equation (3) indicates that the OPB pixel output value Vopb doubles for a temperature increase of every 8 degrees. The temperature T is determined from the accumulation time t and the OPB output value Vopb. The OPB pixel output value Vopb is extremely small when the temperature is low. Hence, if the OPB pixel output value Vopb is too small to be measured, the accumulation time t is increased to make the OPB pixel output value Vopb larger.

Figure 10:
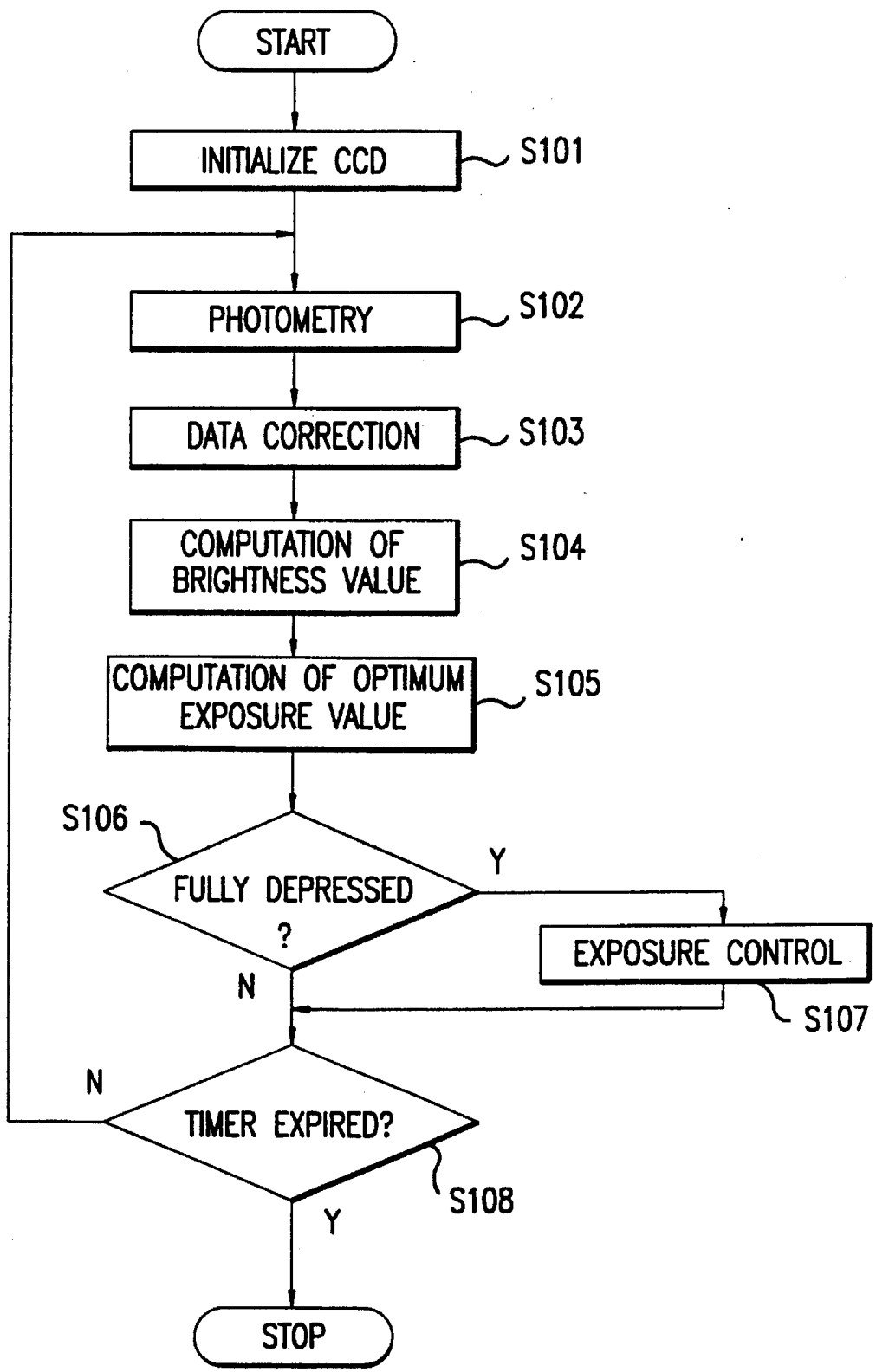
FIG. 10 is a flow chart of the process executed by a microprocessor of a light sensitivity correction device.

FIG. 10 shows the process followed by the microprocessor 10. The microprocessor 10 starts when a camera power source is connected by depressing a shutter button and the microprocessor 10 goes to step S101.

In step S101, the light receiving element 9 (a CCD for this embodiment) is initialized. In this step the microprocessor 10 sets the GAIN and RATE signals to HIGH, sets the initialization signal Vscin to LOW and then outputs the master clock MCK.

In step S102, photometry is conducted using the light receiving element 9. In step S103, the light receiving element output Vout' is corrected for changes in power source voltage, the output circuit gain and other photoelectric conversion parameters due to temperature variations of the 240 regions in the entire subject field.

In step S104, brightness values of the subject field BV(i,j), where i=1,2, . . . ,20 indicating the horizontal address i and j=1,2, . . . 12 indicating the vertical address j of the 240 regions for this embodiment, are determined by reading the aperture stop value F0, the focal length f, and the exit pupil distance value P0 of the mounted shooting lens I from a lens CPU 13. Photometry correction values Z(i,j) indicate the photometry correction value for each horizontal address i and vertical address j of the 240 regions. Each of the 240 regions are calculated on the basis of the photometry correction values using the equation:

$$BV(i,j) = (\log(Vout(i,j)/(t+t0))/\log 2) + Z(i_j) + F0. \qquad (4)$$

where Vout(i,j) is the corrected output of the light receiving element 9 for the (i,j) region of the 240 regions, and t0 is an accumulation time correction value set to one period of the base clock. The brightness value of the subject field BV(i,j) is computed for each photometry region.

The accumulation time correction value t0 may be adjusted to an even more optimum value. For example, when MCK=2.5 Mhz and RATE=HIGH, t0=12.8 μs because the base clock is 78.125 Khz. In addition, when MCK=2.5 Mhz and RATE=LOW, then t0=25.6 μs an optimum exposure value is computed, after the brightness value is determined.

In step S106, if the release button is fully depressed, the microprocessor 10 goes to step S107 and conducts exposure control based on the optimum exposure value. Otherwise the microprocessor 10 goes to step S108.

In step S108, if the shutter button timer has expired, the microprocessor 10 stops. Otherwise, the microprocessor 10 returns to step S102.

Of course, it is apparent that the invention can be applied to a photometry device in products other than a camera.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photometry device, comprising:

a light receiving element generating an output signal from light incident on a subject field, an amplitude of the output signal of the light receiving element corresponding to an intensity of the light from the subject field;

a light sensitivity detection device generating light sensitivity output data;

a temperature detection device generating a temperature value corresponding to a temperature of the light receiving element; and a light sensitivity correction device correcting the amplitude of the output signal of the light receiving element for changes due to temperature variations of the light receiving element based on at least the light sensitivity output data generated by the light sensitivity detection device and an accurate temperature value, wherein the accurate temperature value is generated based on the temperature value and a set of temperature characteristic values of the temperature detection device stored in a memory device, the set of temperature characteristic values accounting for all temperature variations of the temperature detection device.

2. The photometry device of claim 2, wherein the temperature detection device comprises a thermistor circuit.

3. A photometry device, comprising:

a light receiving element generating an output signal from light incident on a subject field, an amplitude of the output signal of the light receiving element corresponding to an intensity of the light from the subject field;

a light sensitivity detection device generating light sensitivity output data;

a temperature detection device generating a temperature value corresponding to a temperature of the light receiving element; and a light sensitivity correction device correcting the amplitude of the output signal of the light receiving element for changes due to temperature variations of the light receiving element based on at least the light sensitivity output data generated by the light sensitivity detection device and the temperature value generated by the temperature detection device, wherein the temperature detection device includes an optically shielded pixel element generating an output value that is related to the temperature of the light receiving element.

4. The photometry device of claim 3, wherein the light receiving element includes the light sensitivity detection device.

5. A photometry device, comprising:

a light receiving element generating an output signal from light incident on a subject field, an amplitude of the output signal of the light receiving element corresponding to an intensity of the light from the subject field;

a light sensitivity detection device generating light sensitivity output data; and a light sensitivity correction device correcting the amplitude of the output signal of the light receiving element for changes due to temperature variations of the light receiving element based on at least the light sensitivity output data generated by the light sensitivity detection device, wherein the light sensitivity detection device includes:

a plurality of monitor pixels, each of the plurality of monitor pixels being disposed near the light receiving element so that a temperature of the plurality of monitor pixels is substantially a temperature of the light receiving element, each of the plurality of monitor pixels being injected with a predetermined amount of electric charge independent of an accumulation period, and a microprocessor, the microprocessor correcting the amplitude of the output signal generated by the light receiving element based on outputs of the plurality of monitor pixels.

6. The photometry device of claim 5, wherein the light sensitivity detection device is a first monitor pixel and a second monitor pixel.

7. The photometry device of claim 6, wherein the microprocessor corrects the amplitude of the output signal based on a correction line, the correction line being determined by output values of the first and second monitor pixels for a predetermined standard condition and for conditions other than the standard condition, the correction line having an equation:

$$V_{data}=(VO2-VO1)/(VO21-VO11)*V_{data}'+(VO1*VO2'-VO1'*VO2)/(VO2'-Vo1'),$$

where VO1 and VO2 are outputs of the first and second monitor pixels for the standard condition, Vo1' and VO2' are outputs of the first and second monitor pixels for conditions other than the standard condition, Vdata and Vdata' are corrected and uncorrected output signal amplitudes, respectively.

8. The photometry device of claim 5, wherein the light receiving element comprises a plurality of light receiving pixels, each of the plurality of light receiving pixels comprising a plurality of spectral sensitivity regions, the microprocessor of the light sensitivity detection device correcting the amplitude of the output signal of the light receiving element for changes due to temperature variations for each of the plurality of spectral sensitivity regions of each of the plurality of light receiving pixels.

9. The photometry device of claim 8, wherein the microprocessor corrects the amplitude of the output signal for each of the plurality of spectral sensitivity regions by multiplying the output signal corresponding to each of the spectral sensitivity regions by a factor based on a predetermined relationship between a sensitivity of each of the plurality of spectral sensitivity regions and temperature.

10. The photometry device of claim 5, wherein the light receiving element includes the light sensitivity detection device.

11. A method for correcting an amplitude of a light receiving element output signal of a light receiving element for changes due to temperature, comprising:

determining correction formulas for the changes due to temperature of the light receiving element output signal amplitude based on at least outputs of a light sensitivity detection device;

determining a current temperature of the light receiving element using a set of temperature characteristic values of a temperature detection device stored in a memory device, the set of temperature characteristic values accounting for all temperature variations of the temperature detection device; and correcting the amplitude of the light receiving element output signal based on at least the current temperature and the correction formulas.

12. The method of claim 11, wherein the current temperature is determined by a temperature detecting device comprising a thermistor circuit.

13. A method for correcting an amplitude of a light receiving element output signal for changes due to temperature, comprising:

determining correction formulas for the light receiving element output signal amplitude changes due to temperature based on at least outputs of a light sensitivity detection device;

determining a current temperature; and correcting the amplitude of the light receiving element output signal at the current temperature based on at least the outputs of the light sensitivity detection device and the correction formulas, wherein the determining correction formulas step includes:

determining first output values of a plurality of monitor pixels at a standard temperature, determining second output values of the plurality of monitor pixels at a temperature other than the standard temperature, and generating a light sensitivity correction formula based on the first and second outputs of the plurality of monitor pixels.

14. The method of claim 13, wherein the plurality of monitor pixels comprises a first monitor pixel and a second monitor pixel and the light sensitivity correction formula comprises a correction line determined by outputs of the first and second monitor pixels for the standard temperature and for the temperature other than the standard temperature.

15. A method for correcting an amplitude of a light receiving element output signal for changes due to temperature, comprising:

determining correction formulas for the light receiving element output signal amplitude changes due to temperature based on at least outputs of a light sensitivity detection device;

determining a current temperature; and correcting the amplitude of the light receiving element output signal at the current temperature based on at least the outputs of the light sensitivity detection device and the correction formulas, wherein the light receiving element comprises a plurality of spectral sensitivity regions and the output signal of the light receiving element comprises outputs of the plurality of spectral sensitivity regions, the determining correction formulas including:

(a) determining a relationship between the plurality of spectral sensitivity regions and temperature, (b) determining a correction factor for each of the spectral sensitivity regions based on the relationship determined by step (a) and the current temperature, and (c) correcting the output of the light receiving element by multiplying the output of each of the spectral sensitivity regions by the corresponding factor determined in step (b).

16. A method for correcting an amplitude of a light receiving element output signal for changes due to temperature, comprising:

determining correction formulas for the light receiving element output signal amplitude changes due to temperature based on at least outputs of a light sensitivity detection device;

determining a current temperature; and correcting the amplitude of the light receiving element output signal at the current temperature based on at least the outputs of the light sensitivity detection device and the correction formulas, wherein the current temperature is determined by a microprocessor of a light sensitivity correction device based on an output of an optically shielded pixel element.

* * * * *